(12) United States Patent
Billings et al.

(10) Patent No.: US 8,656,179 B2
(45) Date of Patent: Feb. 18, 2014

(54) USING HIDDEN SECRETS AND TOKEN DEVICES TO CREATE SECURE VOLUMES

(76) Inventors: Roger E. Billings, Independence, MO (US); John A. Billings, Independence, MO (US)

( * ) Notice: Subject to any disclaimer, the term of this patent is extended or adjusted under 35 U.S.C. 154(b) by 420 days.

(21) Appl. No.: 12/397,323

(22) Filed: Mar. 3, 2009

(65) Prior Publication Data

US 2010/0228990 A1 Sep. 9, 2010

(51) Int. Cl.
*H04L 9/06* (2006.01)
(52) U.S. Cl.
USPC ............. 713/185; 726/9; 380/44; 380/45; 380/46
(58) Field of Classification Search
USPC ............. 713/185; 726/9, 22; 380/44, 45, 46
See application file for complete search history.

(56) References Cited

U.S. PATENT DOCUMENTS

| | | | |
|---|---|---|---|
| 2007/0118891 A1* | 5/2007 | Buer | 726/8 |
| 2007/0180239 A1* | 8/2007 | Fujibayashi et al. | 713/165 |
| 2007/0288745 A1* | 12/2007 | Kwan et al. | 713/155 |
| 2008/0016537 A1* | 1/2008 | Little et al. | 725/81 |

* cited by examiner

*Primary Examiner* — Nadia Khoshnoodi
*Assistant Examiner* — Ayoub Alata

(57) ABSTRACT

A system for encrypting Secure Volumes using an encryption key which is saved in the open after being encoded inside a hardware token device utilizing a secure secret which is stored inside the device, and which never leaves the device. The encrypted volume can be accessed again only after a hardware token has decoded this encryption key. The system also provides means whereby the holder of a Master token and the holder of a Grand Master token may also have access to the volume as long as the user token was previously registered to the Master token, and the Master Token was previously registered to the Grand master token before the secured volume was encrypted. Also, the system allows members of user groups so designated at the time the volume is encrypted, to be able to have access to the volume as long as their token was previously registered with the same Master Token as the user that encrypted the volume and as long as the token encrypting the volume was also a member of the authorized user group.

19 Claims, 5 Drawing Sheets

USING HIDDEN SECRETS AND TOKEN DEVICES TO CREATE SECURE VOLUMES

BACKGROUND OF THE INVENTION

This invention relates to the use of security token devices to secure data on computers, providing a dual factor method of user authentication, but doing so in such a manner that the token can be used to secure an unlimited number of volumes of encrypted data, each with a unique encryption key. The invention also provides a system whereby, at the user's discretion, others may also have access to the encrypted volume.

Traditionally, access to a computer is controlled by software which requires the user to login using a special password already known to the computer. If the password entered by the user matches the password previously registered with the computer, the user is allowed access to the system. Similarly, by entering the correct password, a user can log into a remote storage server where control software determines which files can be read or updated.

More recently, with the need to improve security, some computers require a user to have a hardware device to assist in the login process. This hardware token is usually a "smart card" or a Universal Serial Bus (USB) device. In either case, the token has the ability to store information or secrets in such a way that they can only be accessed in accordance with the programming inside of the device. In conventional use, the tokens store passwords used to log into computers and servers. To log in, a user must enter a PIN (Personal Identification Number) associated with the token. The token then unloads the secret user password and permits login. This security approach is better than just a password since access to the system requires "something you know"—the PIN, and "something you have"—the security token.

State-of-the-art products thus providing dual factor authentication suffer from deficiencies and limitations that limit the realization of their full potential and effectiveness.

First, if the token uses the same internally stored password to log into a large number of systems, anyone having that password would gain access to the entire system. On the other hand, if every system had a unique password, the token would need to store all of the passwords which would require more internal memory inside the device and still limit the number of systems that could be accessed.

Second, once a system has been secured by a token, if the token is lost or damaged, access to the system is lost along with protected data and information.

Third, current systems do not provide a scheme whereby access protected by a security token device can be managed in such a way that users can be organized into security groups, and each member of a group can share access to computers, servers, storage volumes, or protected facilities.

Fourth, since the method of limiting access to data on a computer or a server is limited by software programming intended to control access to the data, in the event that the security software has been breached, the intruding user gains access to the restricted files.

Fifth, the task of managing security levels and user passwords on a large number of servers becomes burdensome and unreliable. Complex and difficult to manage software is necessary, and even then provides a solution of only limited effectiveness.

BRIEF SUMMARY OF THE INVENTION

In view of the above described state of the art, the present invention seeks to realize the following objects and advantages.

It is an object of the present invention to provide a system of dual factor authentication that will allow a security token device to control access to an unlimited number of encrypted volumes stored on computers, servers, or other equipment, hereinafter referred to as a secured device, each volume requiring a unique encryption key, without the usual requirement for storing each encryption key inside of the token.

It is another object of the present invention to provide a system whereby encrypted volumes secured by a token can also be opened by a designated master token in the event that the original token is not available thereby preventing the loss of resource resulting from a lost or damaged token.

It is a further object of the present invention to provide a system whereby encrypted volumes secured by a token can also be opened by a designated "grand master" token in the event that the original token and the master token are not available.

It is yet another object of the present invention to provide a system whereby groups of users can be designated in a prescribed manner such that authorized groups of users may gain access to encrypted volumes secured by a token so long as the user tokens are authorized members of authorized groups intended to have access to the encrypted resources.

It is also an object of the present invention, to provide another means of protecting data on a computer or other secured device which means is independent of conventional security programs, and which means allows access to the data by tokens held by members of user groups, Master tokens, and Grand Master tokens, and to thereby eliminate the need for complex and unwieldy directory and server management programs which attempt to manage user access even over a large number of separate servers.

These and other objects and advantages of the invention will become more fully apparent from the description and claims which follow, or may be learned from the practice of the invention.

For the best data protection, every piece of data should be encrypted before it is sent over the network or stored on any server. Furthermore, all encryption should be "strong encryption" such as AES with 256 bit keys. The problems arise, when the data must be shared by one or more user. Current hardware security systems have been plagued with users locking themselves out of their own data with no way to recover. There seems to be overlapping boundaries between enough protection and too much protection.

The current invention provides a radically different approach to securing data stored on computers, Servers, and sent over the network. It is based upon the most secure methods of data encryption currently available, and is a complete, hardware based method of protecting data, even on remote servers. In addition to the robust protection of data, the invention provides the user with a here-to-fore unavailable flexibility to be able to access and manage the access of data that has been secured.

The invention is based upon a novel new method of using a hardware security token such as a Smart Card or a USB security token to protect Secure Volumes of data, while providing manager access and even group access to data according to a user specified criteria. The entire encryption system is compatible with popular operating systems and Servers currently in use, and can therefore be added on top of or in place of current security safeguards.

In this invention, a portable, smart-token device has the ability to connect to a computer, and to process and store data securely inside the device. The token has the ability to store one or more secrets that can be used to encrypt and decrypt data passing through the token. These stored secrets cannot be read from the token, but only used by the token. In use, the token device uses a random number, normally generated by hardware inside the device, for use as the AES strong encryption key which is used for the purpose encrypting and decrypting data on a Secure Volume of a computer, server, or attached device such as a flash drive. A Secure Volume is a grouping of data that share a common encryption key or cipher. The token device uses a secret previously stored inside the token to encrypt the random number making what will be referred to as a Hidden Secret. The Hidden Secret is then stored in the header of the Secure Volume.

When the user attempts to access a Secure Volume, the token requires the user to enter a PIN (Personal Identification Number) to verify that the user is authorized to use the token. If the user correctly enters the PIN, the token receives the Hidden Secret (encrypted version of the encryption key) that was previously stored in the header of the encrypted volume at the time the volume was created. Inside of the token, the device uses its internally stored secret to decrypt the Hidden Secret, the plain-text version of which can then be transferred back to the computer to be used as the decryption key to read the volume, and access is granted to the encrypted data.

In the preferred embodiment, this invention is used to secure a volume on a Windows computer, a network Server or a flash drive. A USB token device which has been designed to perform "hidden secret" security, has the ability to store secrets that can be used as AES keys. Each secret is 256 bits in length. Each token has a secret, known as the Primary Secret, which is programmed into the device during the registration process. The Primary Secret is unique to each token, and it is the secret used primarily by that device. The token also can store other secrets, the use of which will be described later. Access to the secrets is protected by a user PIN which must be provided by the user to unlock the token. The token has the internal processing ability to perform AES 256 bit encryption and decryption of data using one of the stored secrets. The device also has hardware capable of generating 256 bit random numbers.

To use the token on a Windows computer to create a Secure Volume, special software must first be installed. The software provides the function of interacting with the token as will be described. It also performs the task of creating Secure Volumes on the local drive, on Servers and on attached devices such as flash drives or DVD drives. After Secure Volumes have been created, the software encrypts data to be stored on the volumes and decrypts data read from Secure Volumes utilizing keys provided by the token. The software also writes Hidden Secrets into the header of Secure Volumes. The Hidden Secrets are used by the token to manage the keys required to encrypt and decrypt the data.

During the process of using the token to create a Secure Volume, a random number is generated inside the token hardware. The new random number is given from the token to the provided software to be used as the key to encrypt the volume. Then the token's Primary Secret is used to encrypt the random number to create the resultant Hidden Secret. The Hidden Secret is sent to the software to be stored as part of the header to the encrypted volume.

When the user wishes to extract data from the encrypted volume, the token must first be inserted into the computer and the correct PIN entered to activate the token. The software then reads the Hidden Secret from the header of the encrypted volume and sends it to the token. The token uses its Primary Secret to decipher the key, and then provides the key to the software which uses it to be able to read and write from the Secure Volume.

As can be seen, the token can access an unlimited number of Secure Volumes each using strong encryption. The encryption key for every Secure Volume is unique, and yet none of the keys actually used for encryption are stored inside of the token. Instead, each key is stored right in file header on whatever storage media as a "Hidden Secret".

An important benefit of this invention is the ability to allow access to the Secure Volumes by other users with other tokens, but under controlled conditions. In the preferred embodiment of the invention, the other tokens having access to the Secure Volumes are the Master Token, the Grand Master Token, and registered Group tokens.

In order to facilitate the Master Token feature of the invention, the user's token must be registered with the Master Token before the Secure Volume is created. The step of registering a user token with a Master Token would usually be performed when the token is assigned to a user. In the preferred embodiment of the invention, a special registration program is run on a computer into which the user token and the Master Token have both been inserted into USB ports. To secure the registration process, a pre-learned Registration Secret is programmed into every token at the time of manufacture. The Registration Secret is used to encrypt communications between the tokens during the beginning of the registration process.

BRIEF DESCRIPTION OF THE DRAWINGS

In order to better appreciate how the above-recited and other advantages and objects of the invention are obtained; a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
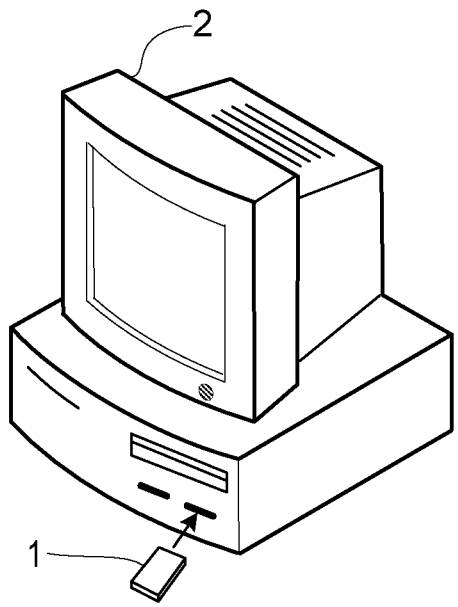
FIG. 1 is a perspective view illustrating the insertion of a USB token into a Windows computer.
Figure 2:
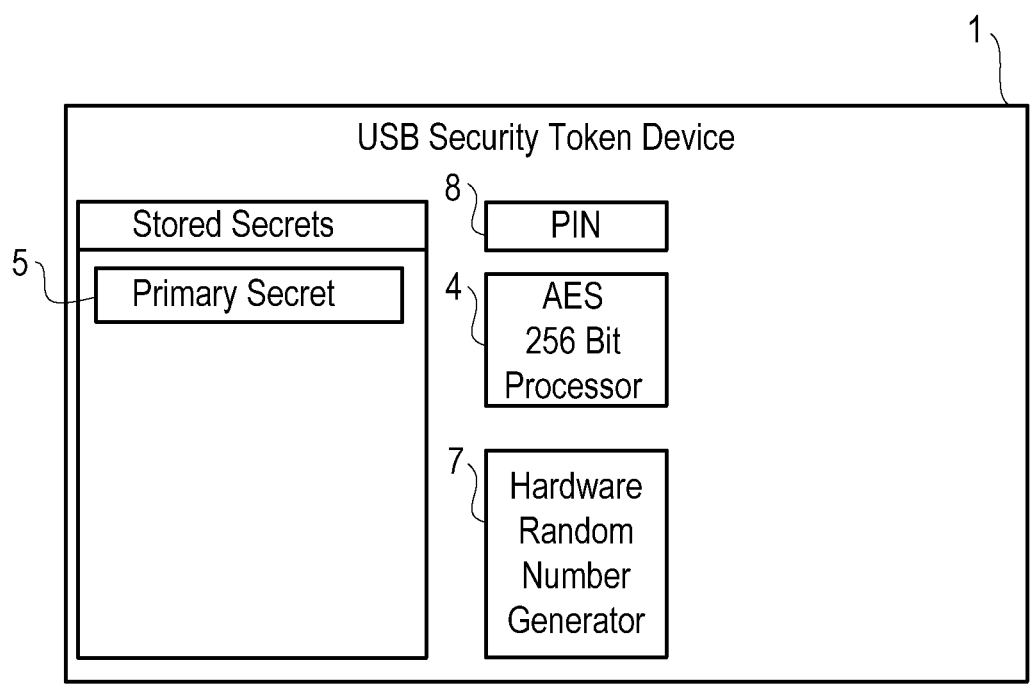
FIG. 2 is a block diagram of registers and functionality inside the token device.

Reference will now be made to the drawing wherein like structures will be provided with like reference designations. Referring first to FIG. 1, a USB security token device 1 is inserted into a USB port on a Windows XP computer 2. The security token 1 has been implemented according to the principles of the present invention, and as such, has the ability to securely store secrets. In the example of the preferred embodiments of the invention, the security secrets are used as Advanced Encryption Standard (AES) keys to facilitate "strong" encryption. AES strong encryption keys are 256 bits in length and are used to encrypt and decrypt data, passwords and other information. FIG. 2 shows the secrets that are stored inside of each token. The Primary Secret 5 is programmed into the device during the registration process which will be described later. It is unique to each token, and is the secret used primarily by each device. The token also can store other secrets, the use of which will also be described later. Access to the secrets is protected by a user PIN 8 or secret code which must be provided by the user to unlock the token. The token also has an internal AES 256 processor 4 to perform AES 256 bit encryption and decryption of data using one of the stored secrets. The device also has a 256 bit hardware random numbers generator 7 which is used to create secrets as required when the user token 1 is used to perform the security functions.

Figure 3:
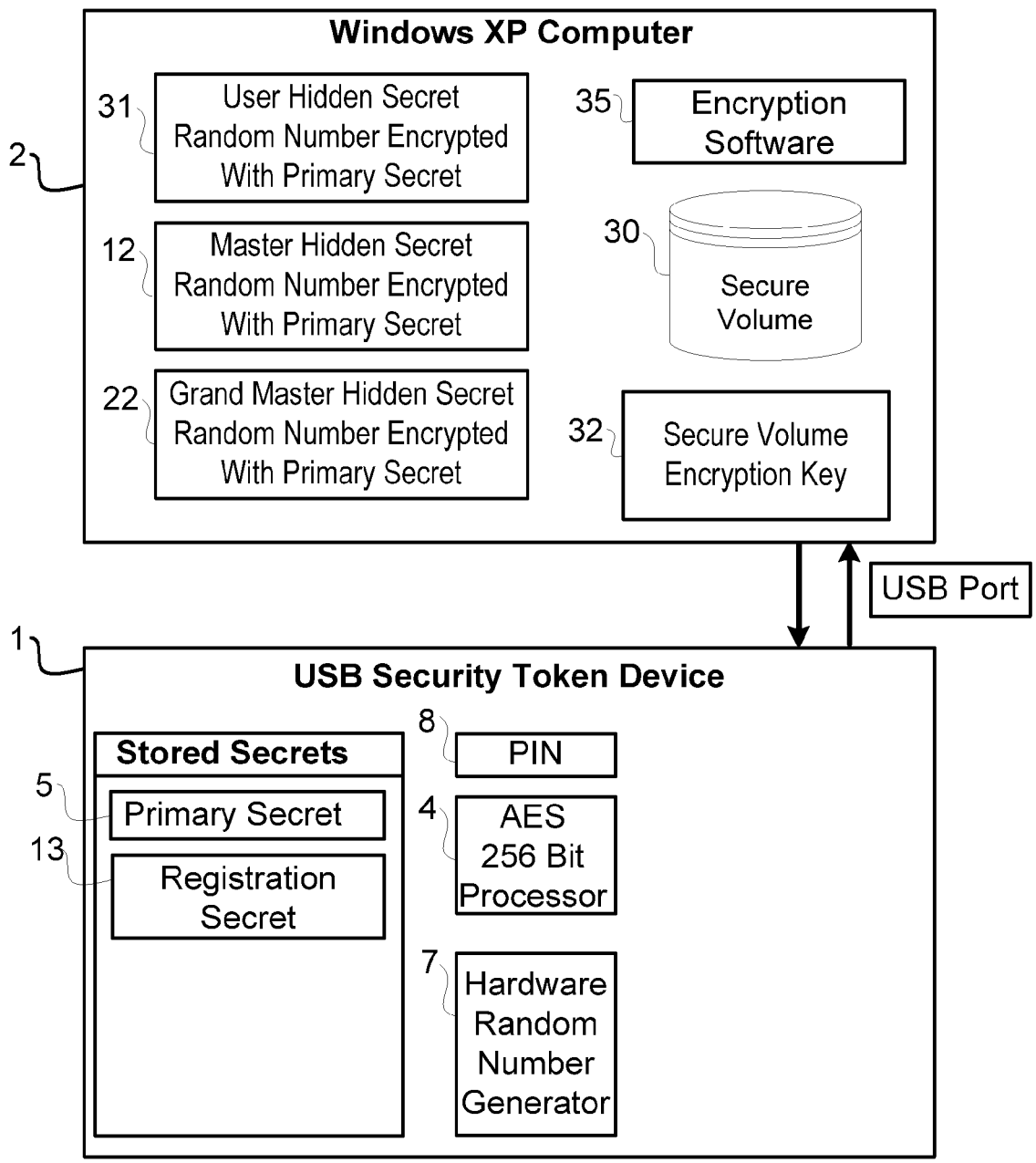
FIG. 3 is a block diagram showing the relationship of the token device to a Windows computer.

In one example of the preferred embodiments (see FIG. 3), the token is used to make an encrypted volume to securely store data on a Windows XP computer 2. Before the Secure Volume is created, special encryption software 35 must be installed. The software is used in conjunction with the token device which provides secure keys to encrypt and decrypt data as it is stored or read from the Secure Volume 30.

During the process of using the token to encrypt a Secure Volume, a random number is generated inside the token hardware. The new random number is provided to the encryption software 35 which uses the random number as the AES cipher to encrypt the data before it is stored in Secure Volume 30. The random number, also referred to as the Secure Volume Encryption Key 32 is not stored on the computer 2. Next, the random number is AES encrypted inside the token 1. The AES encryption cipher used to encrypt the random number is the Primary Secret 5 which was already stored inside the user token. The resulting encrypted version of the Secure Volume Encryption Key 32 is then stored in the open as part of the file header of the Secure Volume 30. The encrypted version of the random number that is stored on the computer is called the User Hidden Secret 31 since although it is stored in the open on the computer, it cannot be used to decrypt the Secure Volume 30 without first being deciphered itself, inside the token 1.

When the user wishes to access data which has been stored in the Secure Volume 30 on the Windows computer 2, the token is inserted into the computer USB port, and the software 35 prompts the user to enter the PIN 8 associated with the token. The entered PIN is transferred into the token where it is compared with the internally stored PIN 8 value for a match. If it does match, the user token 1 receives the User Hidden Secret 31, which is the encrypted version of the AES key used to encrypt the Secure Volume 30. The user token 1 decrypts the User Hidden Secret 31 using its internally stored, Primary Secret 5. The original Secure Volume Encryption Key 32 is given from inside the token, back to the Windows machine via the USB port where it is used by the encryption software 35 to decrypt the data stored in the Secure Volume 30.

As can be seen, the token can, by this method, secure an unlimited number of Secure Volumes with "strong" AES encryption. The AES cipher for every Secure Volume 30 is unique and completely random, and yet none of the ciphers used to encrypt any of the Secure Volumes are stored inside of the user token 1. Instead, each cipher is stored right in the open on the Windows computer as a User Hidden Secret 31.

In addition to the ability of being able to create Secure Volumes on an unlimited number of computers, the User Hidden Secret implemented according to the principles of the present invention, provides the ability to allow access to a Secure Volume by other tokens under certain conditions. Other tokens having access to the Secure Volume on the Windows computer are the Master Token, the Grand Master Token, and registered Group tokens.

Figure 4:
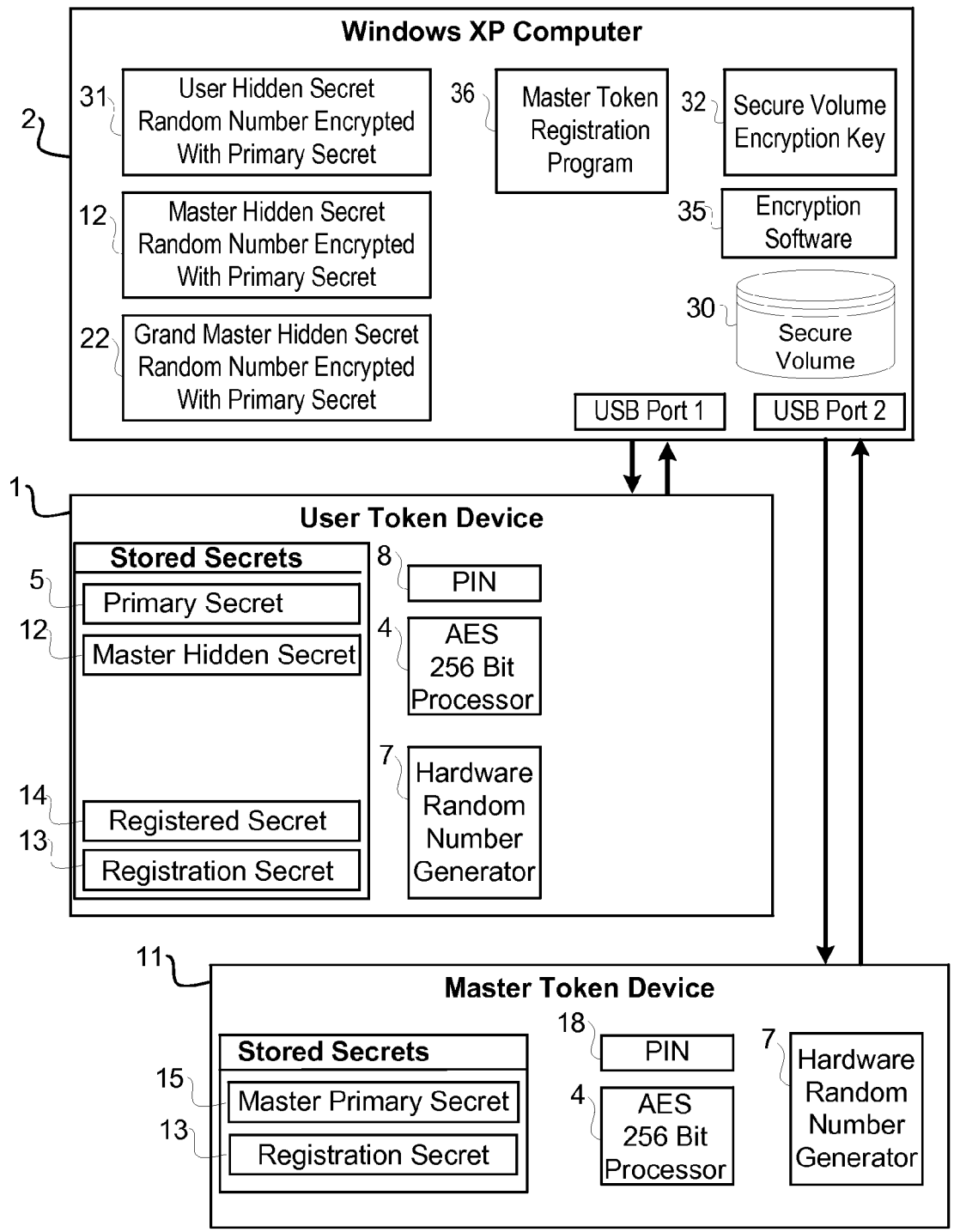
FIG. 4 is block diagram representing the registration of a user token with a Master token using software installed on a Windows computer.

In order to facilitate the Master Token feature using the teachings of the invention, the user's token 1 must be registered with the Master Token 11 before the Secure Volume 30 is created (refer to FIG. 4). The step of registering a user token 1 with a Master Token 11 would usually be performed when the token is assigned to a user. In the preferred embodiments of the invention, a special Registration Program 36 is run on a computer into which the user token 1 and the Master Token 11 have both been inserted into USB ports. To secure the registration process, a pre-learned Registration Secret 13 is programmed into every token at the time of manufacture. The Registration Secret 13 is used to encrypt communications between the tokens during the beginning of the registration process.

In the preferred embodiments of the invention, the following tasks are performed during the registration process.

Task 1—Programming New Registered Secret

The Registration Secret 13 is used by the Master Token 11 to encrypt communications to the user token 1. The encrypted communications can safely be sent through the programming computer 2 and can be decrypted inside user token 1 by use of the Registration Secret 13. By this means, the Master Token 11 can securely write a new Registered Secret 14 to user token 1. The Registered secret is used to secure communication for the rest of the registration process. When a token's Registered Secret is changed, all other secret data on the user token 1 is automatically erased.

Task 2—Programming New Primary Secret and Master Hidden Secret

Using the provided secure link between the tokens, the Master Token 11 writes a new Primary Secret 5 to the user token 1. The Master Token 11 then uses its own internal Primary Secret 15 to encrypt the user token secret 5, creating a Master Hidden Secret 12 version of the user token's Primary Secret 5. The Master Hidden Secret 12 version of the user token's secret 5 is also sent over the secure link to the user token 1 where it is stored as the Master Hidden Secret 12. The purpose of storing a copy of the user token's Primary Secret 5 that has been encrypted by the Master Token 11 will be described later.

Task 3—Programming Grand Master Hidden Secret

Figure 5:
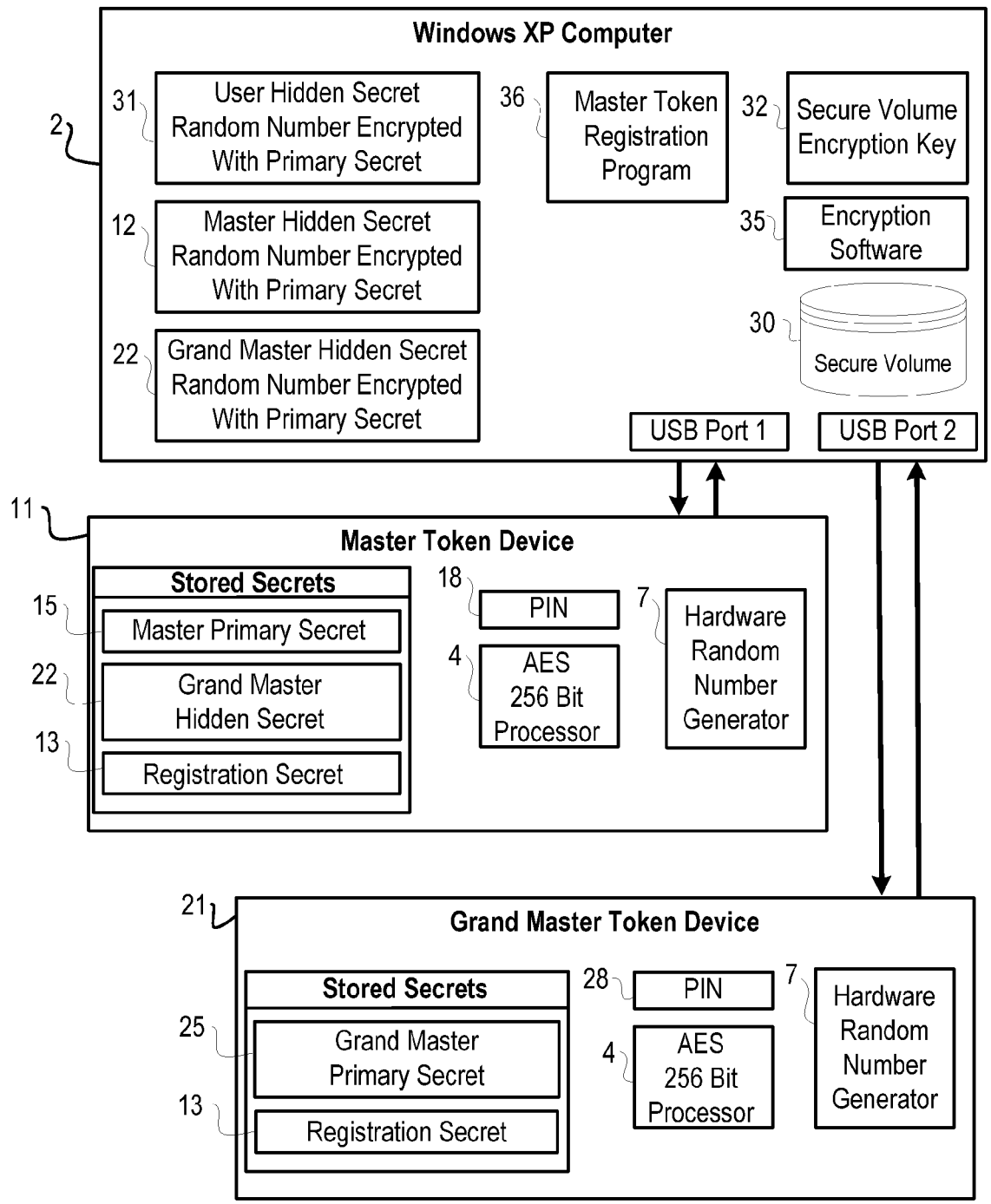
FIG. 5 is a block diagram depicting the registration of a Master token with a Grand Master token.
Figure 6:
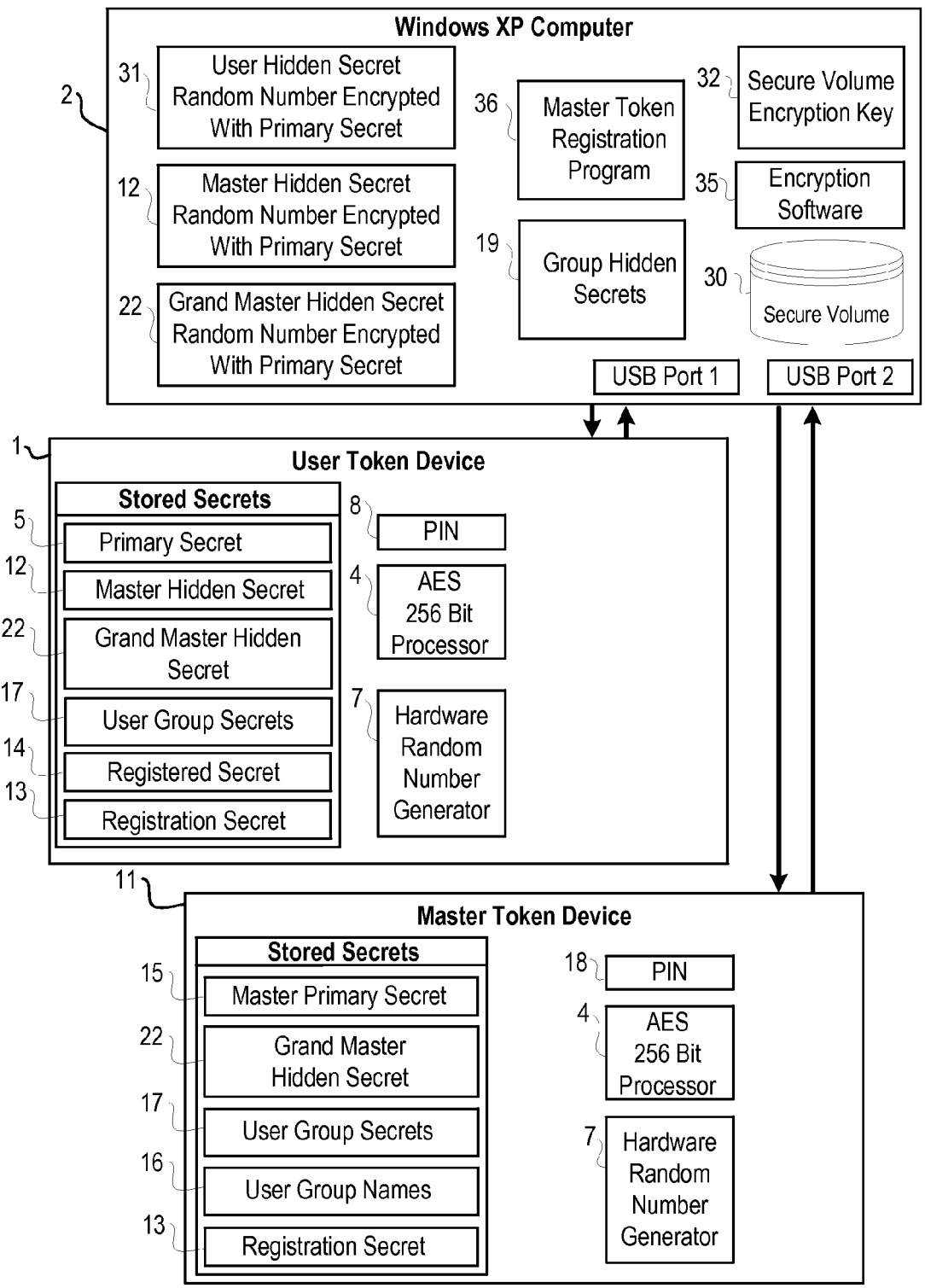
FIG. 6 is a detailed block diagram representing the use of the tokens to access a Secure Volume by the user token, the Master token, the Grand Master token, and by membership of various user groups.

If the Master Token 11 has been previously registered with a Grand Master Token 21 in a process similar to the user token registration described in Tasks 1 and 2, the Master Token 11 will have stored a Grand Master Hidden Secret 22 (refer to FIG. 5). The Grand Master Hidden Secret 22 is a "hidden" version of the Master Primary Secret 15 of the Master Token 11 that has been encrypted inside the Grand Master Token 21 using the Grand Master's Primary Secret 25. Now referring to FIG. 6, if the Master Token 11 has been previously registered, the Grand Master Hidden Secret 22 is sent over the secure link and is stored inside of the user token 1. The use of the Grand Master Hidden Secret 22 will be described later.

Task 4—Programming User Groups

The Master Token Registration Program 36 then lists on the operator's screen, a number of user groups which the Master Token Registration Program 36 reads from the Master Token 11. These user groups have names 16 which were previously created by the Master user when the Master Token 11 was initially programmed. The operator then selects which of the groups the owner of the user token 1 being programmed will be allowed to access. Once the selection has been made, the Master Token Registration Program 36 prompts the Master Token 11 to send over the secure link the user groups secrets 17 for each of the selected user groups. The user groups secrets 17 are then stored inside the user token 1. The use of the User Groups Secrets will be discussed later.

Task 5—Personalization of User Token

The user token 1 can optionally be personalized at this time. The personalization process allows the user to select a PIN for the token, and to enter other personal information that will be used by the user token 1 to verify the user in the event that the user wishes later to change the PIN number or other personal information.

The registration process is completed when the Master Hidden Secret 12, the Grand Master Hidden Secret 22, and the User Groups Secrets 17 have been securely programmed into the user token 1. It is important to note that it is not necessary to write or modify any information inside the Master Token 11 during the process of registering a user token 1. Consequently, there is no limit to the number of user tokens 1 that can be registered with a single Master Token 11, nor is there any limit to the number of Master Tokens that can be registered with a Grand Master Token 21.

After completion of the registration process, the user token 1 can be used to create a Secure Volume 30 on a Windows computer as described previously. Since the user token 1 has now been registered with a Master Token 11, the process of securing the volume on the Windows machine can also provide support for a Master or even a Grand Master token to access the volume data. To accomplish this, when the user token 1 sends the User Hidden Secret 31 version of the AES encryption cipher to the encryption software 35, it can also pass the Master Hidden Secret 12 and the Grand Master Hidden Secret 22 which can also be stored in the open as part of the header of the Secure Volume 30.

After the Secure Volume 30 has been created on the Windows computer by a user token 1 that has previously been registered with a Master Token 11, the owner of the Master Token 11 or the owner of the Grand Master Token 21 can decrypt the Secure Volume.

When the owner of the Master Token 11 wishes to decrypt the Secure Volume 30 on the Windows computer, the Master Token 11 is inserted into the computer and the encryption software 35 prompts the user to enter the PIN 18 associated with the Master Token 11. The entered PIN is transferred inside the token 11 where it is compared with the internally stored PIN value for a match. If it does match, the Master Token 11 receives the User Hidden Secret 31 which is the AES encryption cipher used to encrypt the Secure Volume 30 stored as part of the header of the Secure Volume 30 on the computer. It also receives the Master Hidden Secret 12, a copy of which was also stored as part of the header of the Secure Volume 30 when the volume was created.

The Master Token 11 uses its Primary Secret 15 to decrypt the Master Hidden Secret 12, which when decrypted, is the Primary Secret 5 of the user key 1 that created the Secure Volume 30. Using this Primary Secret 5, the Master Token 11 is able to now decrypt the User Hidden Secret 31 thereby obtaining the AES encryption key used to encrypt the Secure Volume 30. Using the plain-text key 32, the owner of the Master Token is able to read and write files on the Secure Volume 30.

The process is similar for the owner of the Grand Master Token, except that an additional step is required. In addition to reading the User Hidden Secret 31 and the Master Hidden Secret 12 from the header of the Secure Volume 30, the Grand Master also reads the Grand Master Hidden Secret 22, which is the Master Primary Secret 15 of the Master Token 11 encrypted by the Grand Master Primary Secret 25 of the Grand Master Token. Since it knows the Grand Master Primary Secret 25, it can decode the Master's Primary Secret 15 from the Grand Master Hidden Secret 22, and then continue thereby obtaining the AES encryption key used to encrypt the Secure Volume 30 in the same way it is obtained by the Master Token 11 above.

In a similar manner, the user token 1 may use the User Group Secrets 17 it has stored to allow access to other user tokens. Which groups will be allowed to access the Secure Volume 30 can be chosen by the user at the time the volume is initially secured. This is done by adding one more step to the previously described process of securing the Secure Volume 30 on the Windows computer. In this additional step, the random number used to encrypt the Secure Volume 30 is also encrypted using each User Group Secret 17 that corresponds to a user group that should have access to the Secure Volume 30. The resulting User Group Hidden Secrets 19 will also be sent to the encryption software 35 for open storage in the Secure Volume 30 header in a manner similar to the other "Hidden" secrets. There after, any user token which received the appropriate User Group Secret 17 during the registration process, can receive from the Windows computer 2 the User Group Hidden Secret 19 which it can then decrypt using the associated User Group Secret 17 thereby obtaining the Secure Volume encryption key 32 and gaining access to the account.

In view of the foregoing, it will be appreciated that the present invention's feature of using Hidden Secrets to secure and manage ciphers to encrypt and decrypt data on a Windows computer could in a similar manner be utilized to encrypt and secure data on a remote server or even some other storage device such as a flash drive or CD. The fact that each encrypted file or data can be secured with a cipher, and yet that a user token can be utilized to clear the ciphers to unlock an unlimited number of encrypted files without the cumbersome need to store and manage each and every encryption cipher for every volume or file provides advantages not previously available in the industry. The present invention also allows an unprecedented level of access to secured resources by holders of Master Tokens, Grand Master Tokens, and even members of designated user groups without the inherent vulnerabilities associated with alternative strategies and back doors. The present invention provides a more effective and secure method of balancing security with usability, allowing users a robust and standards based solution to protect vital assets while yet maintaining an adequate alternative access solution should the need arise.

What we claim is:

1. A system for securely encrypting and decrypting controlling secure access by a user to encrypted data stored on a computer system comprising:
    one or more secure volumes which are groups of encrypted data that share a common encryption key or cipher created on the computer by special software to store encrypted data;
    a security token device configured to enable the user to encrypt, decrypt and control the access by the user to the data being stored within the secure volume of the computer system, wherein the security token device does not store the volume encryption key;
    an interface configured to allow the security token device to communicate with the computer system;
    a primary secret associated with each security token device, wherein the primary secret is stored inside the security token device but is not accessible external to the security token device and never leaves the security token device, not even in encrypted form; and
    a hidden secret for each secure volume consisting of the encryption key for each secure volume which has been hidden by a cryptographic module within the security token device using the primary secret of the security token device to encrypt the volume encryption key, wherein the hidden secret is then stored in the open as part of the unencrypted header of the secure volume with which it is associated; and the cryptographic module configured to use the primary secret for (a) encrypting the secure volume encryption key, (b) sending the resulting hidden secret via the interface to the computer system, (c) storing the hidden secret in the open as part of the header of the secure volume, (d) receiving the hidden secret from the computer via the interface, (e) decrypting the hidden secret inside the security token using the primary secret as the decryption key, and (f) providing the decrypted secure volume encryption key, via the interface, to the computer to allow access to the encrypted data inside the secure volume by the user.

2. The system of claim 1, further comprising:

a random number generator for generating, within the security token, the secure volume encryption key;

wherein the security token device communicates with the computer system to configure access to the data stored within the secure volume by the user based upon the secure volume encryption key; and wherein the cryptographic module encrypts the key to form the hidden secret.

3. The system of claim 1, wherein the interface is configured to communicate with a USB interface of the computer system.

4. The system of claim 1, wherein the security token device is configured as a smart card.

5. The system of claim 1, further comprising a master hidden secret that is stored in the open as part of the header of the secure volume and is accessible from the computer system, wherein the master hidden secret is decrypted by a master token.

6. The system of claim 1, further comprising a grand master hidden secret that is stored in the open as part of the header of the secure volume and is accessible from the computer system, wherein the master hidden secret is decrypted by a grand master token.

7. The system of claim 1, further comprising a user group secret that is stored in the open as part of the header of the secure volume and is accessible from the computer system, wherein the group hidden secret is decrypted by the user group secret.

8. The system of claim 1, further comprising a registration secret within the storage for enabling secure programming of the security token device by a master token and a grand master token.

9. The system of claim 1, further comprising a PIN stored within the security token device and configured by the user, wherein the PIN is provided via the interface to operate the security token.

10. The system of claim 1, further comprising personalization information stored within the storage and configured by the user.

11. A method for securely encrypting and decrypting data stored on a computer system using a security token, comprising the steps of:

creating one or more secure volumes which are groups of encrypted data that share a common encryption key or cipher on the computer using special software;

configuring access control to the encrypted data in the secure volume by the further steps of:

generating a secure volume encryption key;

creating a hidden secret for each secure volume, which consists of the encryption key for each secure volume which has been hidden by a cryptographic module within the security token using the primary secret of the security token to encrypt the volume encryption key, wherein the hidden secret is then stored in the open as part of the unencrypted header of the secure volume with which it is associated; and gaining access to the secure volume by the further steps of:

loading, via the interface, the hidden secret from the header of the secure volume, into the security token;

decrypting, within the cryptographic module the hidden secret, using the stored primary secret to recreate the secure volume encryption key, wherein the primary secret is stored inside the token but is not accessible external to the security token and never leaves the token, not even in encrypted form; and sending, via the interface, the secure volume encryption key to the computer system to gain access to the encrypted data stored in the secure volume.

12. The method of claim 11, further comprising the step of using a random number generator of the security token to generate a random number that forms a secure volume encryption key.

13. The method of claim 11, further comprising the steps of:

reading a master hidden secret from the storage of the security token; and storing, via the interface, the master hidden secret in the open in the header of the secure volume;

wherein the master hidden secret allows a master token to access the secure volume using the primary secret.

14. The method of claim 13, further comprising the steps of:

reading a grand master hidden secret from the storage of the security token; and storing, via the interface, the grand master hidden secret in the open in the header of the secure volume;

wherein the grand master hidden secret allows a grand master token to access the secure volume using the master hidden secret and the primary secret.

15. The method of claim 11, further comprising the steps of:

creating one or more user group hidden secrets by encrypting the secure volume encryption key by using a cryptographic module of the security token and the user group secrets stored within a storage of the security token as an encryption cipher; and storing, via the interface, the user group hidden secrets in the header of the secure volume;

wherein each of the group hidden secrets allow an authorized group member token to access the encrypted data stored in the secure volume.

16. The method of claim 11, further provisioning a security token to allow a master token access to a secure volume previously secured by a security token, comprising the steps of:

creating a secure communications link between the security token and the master token using a registration secret stored within both the security token and the master token;

generating, a random number that forms a primary secret;

transferring the primary secret from the master token to the security token via the secure communications link;

storing the primary secret within the storage of the security token such that the primary secret is not accessible external to the security token;

encrypting, within the master token, the primary secret using a master primary secret stored within the master token to form a master hidden secret;

transferring the master hidden secret to the security token via the secure communication link; and storing the master hidden secret within a storage of the security token.

17. The method of claim 16, further comprising the steps of:

provisioning a master token to allow a grand master token access to a system volume previously secured by a security token, comprising the further steps of:

creating a secure communications link between the master token and the grand master token using a registration secret stored within both the grand master token and the master token;

generating, a random number that forms a master primary secret;

transferring the master primary secret from the grand master token to the master token via the secure communications link;

storing the master primary secret within the storage of the master token such that the master primary secret is not accessible external to the master token;

encrypting, within the grand master token, the master primary secret using a grand master primary secret stored within the grand master token to form a grand master hidden secret;

transferring the grand master hidden secret to the master token via the secure communication link; and storing the grand master hidden secret within a storage of the master token.

18. The method of claim 16, further comprising the steps of:

reading one or more group secrets from the storage of the master token;

transferring, via the secure communication link, the group secrets to the security token; and storing the group secrets in the storage of the security token.

19. The method of claim 18, further comprising the steps of:

reading one or more group secrets from the storage of the grand master token;

transferring, via the secure communication link, the group secrets to the master token; and storing the group secrets in the storage of the master token.

\* \* \* \* \*